UNITED STATES PATENT OFFICE.

EDWIN O. BARSTOW, OF MIDLAND, MICHIGAN, ASSIGNOR TO THE DOW CHEMICAL COMPANY, OF MIDLAND, MICHIGAN, A CORPORATION OF MICHIGAN.

METHOD OF MAKING MAGNESIUM ARSENATE.

1,344,018.  Specification of Letters Patent.  Patented June 22, 1920.

No Drawing.  Application filed September 16, 1918. Serial No. 254,200.

*To all whom it may concern:*

Be it known that I, EDWIN O. BARSTOW, a citizen of the United States, and a resident of Midland, county of Midland and State of Michigan, have invented a new and useful Improvement in Methods of Making Magnesium Arsenate, of which the following is a specification, the principle of the invention being herein explained and the best mode in which I have contemplated applying that principle, so as to distinguish it from other inventions.

It is well known that lead arsenate both the ortho-arsenate $Pb_3(AsO_4)_2$ and the acid arsenate ($PbHAsO_4$) as well as the intermediate substance which may be regarded either as a true chemical compound or as a mixture of the foregoing ortho- and acid arsenates, constitute a very efficacious insecticide for combatting many forms of insect pests. The use of such lead arsenate, originating in the vine-growing regions of France, has extended to America and is equally successful in combatting the gypsy moth and protecting orchard trees and many other plant and vegetable growths (See U. S. Dept. of Agriculture, Bureau of Chemistry Bulletin No. 131). It has also become known that calcium arsenate, either as di-calcium ortho arsenate or tri-calcium ortho arsenate constitutes an insecticide possessing many of the qualities which render lead arsenate desirable. (See "*Insecticides, Fungicides and Weed Killlers*," by E. Bourcart, 1913). Satisfactory manufacturing methods, however, have not apparently been devised as yet whereby this last mentioned product can be considered a practical success, and there also appear to be difficulties inherent in the character of the product itself, at least as commercially made, in that a salt known as calcium tetrahydric arsenate tends to form, which is very troublesome and renders it necessary to provide against the occlusion thereof by the calcium arsenate.

As a result of considerable experimentation and numerous tests, I have found that magnesium forms a compound, or compounds, with arsenic acid, which are entirely suitable for insecticidal use and possess many admirable characteristics rendering such compound or compounds equal to, if not superior to lead arsenate and certainly much more satisfactory in many respects than calcium arsenate. The present invention accordingly comprehends the new compounds having the composition hereinafter more or less specifically set forth and the method or process of manufacturing the same, which will now be fully described and specifically stated in the following claims.

To the accomplishment of the foregoing and related ends the invention then consists of the novel step or steps hereinafter described, it being understood, however, as to such stated method of manufacture, that changes may be made therein without departing from the spirit of the invention.

As indicated, my new insecticide consists of a magnesium salt of arsenic acid, preferably the ortho arsenate. I have found that both the di-magnesium ortho-arsenate ($MgHAsO_4$) which is also known as the acid arsenate, and the tri-magnesium ortho-arsenate ($Mg_3(AsO_4)_2$) may be formed by properly proportioning the ingredients used in the reaction. The preferable ingredients in the formation of these compounds are magnesium hydrate and arsenic acid in which event the reaction occurring may be represented by the following equations, the first giving the di-magnesium arsenate and the second the tri-magnesium arsenate, viz:

$$Mg(OH)_2 + H_3AsO_4 = MgHAsO_4 + 2H_2O.$$
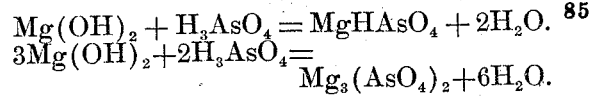
$$3Mg(OH)_2 + 2H_3AsO_4 = Mg_3(AsO_4)_2 + 6H_2O.$$

I have also found that magnesium arsenate may be made by reacting between magnesium chlorid or other soluble magnesium salt, and sodium arsenate, the reaction being represented by the following equation, giving the tri-magnesium compound, viz:

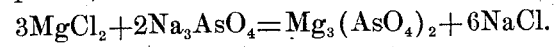
$$3MgCl_2 + 2Na_3AsO_4 = Mg_3(AsO_4)_2 + 6NaCl.$$

The equivalent of acid compound may be produced, if desired, by using with such magnesium chlorid the acid sodium arsenate, or hydrodisodic arsenate, which is the commercial "arsenate of soda," instead of the normal arsenate as indicated by the following equation, viz:

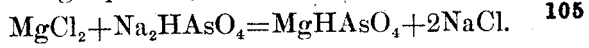
$$MgCl_2 + Na_2HAsO_4 = MgHAsO_4 + 2NaCl.$$

The magnesium arsenate compounds produced as above described and particularly the di- and tri-magnesium ortho-arsenates appear to fulfil all the requirements of the several uses to which lead arsenate has heretofore been put but more satisfactorily and efficiently. In the first place, the compounds in question when in the form of a powder are of less specific gravity and at the same time tend to precipitate in a highly disintegrated form so that whether employed as a paste or powder the compound possesses the property of remaining suspended in water for a considerable length of time and even spraying is thus assured. This is particularly true of the powdered form, the precipitate upon being dried proving much more readily friable than the corresponding lead compound, which, as is well known, requires to be treated specially in order to produce a satisfactory slow-settling mixture with water.

Where magnesium hydrate is used, the latter is suspended in a suitable quantity of water and added gradually to a solution of arsenic acid in water, the whole being stirred during such addition; or if desired, the arsenic acid may be added to the hydrate while thus suspended, although the first-described procedure is preferred. The amount of hydrate will be proportioned to the arsenic acid to give the di- or tri-magnesium compound, as desired. Preferably 3 parts by weight of water will be used in which to suspend the hydrate, and 4 parts of water in which to dissolve the acid.

The arsenate which is formed as a result constitutes a very finely divided flocculent precipitate, due no doubt in part to the corresponding character of the hydrate, and settles relatively slowly. Its separation after the completion of the reaction may be accomplished by centrifuge or filter press and the moisture content reduced either to leave the product in the form of a paste with a predetermined content of water (approximately 80% by weight being found commercially feasible); or the cake, with as much water extracted therefrom as possible, may thereupon be dried, and the material reduced to a powder in any suitable form of mill or pulverizing machine. Preferably a pulverizing machine or disintegrator of the type in which stationary and revolving diaphragms are employed will be used, although this is not as essential as in handling lead arsenate, in which, as is well known, the ball type of mill tends to compact the particles even though they are ground up very finely, with the result that the product settles more rapidly than might be expected.

Contrary to the experience with lead arsenate, the drying and subsequent pulverizing of the magnesium compound seems to render it more slowly settling in character, when afterward mixed with water than when the paste is thus mixed. The powdered form is of course the preferable one in which to handle the compound, although the proportion of water in the paste seems larger than is actually the case, because of the low specific gravity of the compound, compared with lead arsenate, for example.

Other modes of applying the principle of my invention may be employed instead of the one explained, change being made as regards the method herein disclosed, provided the steps stated by any of the following claims or the equivalent of such stated steps be employed.

I therefore particularly point out and distinctly claim as my invention:—

1. The method of making magnesium arsenate, which consists in bringing together magnesium hydrate suspended in water and a watery solution of arsenic acid.

2. The method of making magnesium arsenate, which consists in adding magnesium hydrate suspended in water to a solution of arsenic acid in water.

3. The method of making magnesium arsenate, which consists in bringing together the proper proportions of magnesium hydrate and arsenic acid, said hydrate being suspended in approximately three parts by weight of water and said acid dissolved in approximately four parts by weight of water.

4. The method of making magnesium arsenate, which consists in adding magnesium hydrate suspended in water to a solution of ortho-arsenic acid, said hydrate being thus added in the proper proportions to form the tri-magnesium ortho-arsenate.

5. The method of making magnesium arsenate, which consists in adding magnesium hydrate suspended in water to a solution of arsenic acid in water, separating and drying the precipitate thus formed, and then pulverizing the same.

Signed by me, this 10th day of Sept., 1918.

EDWIN O. BARSTOW.